2,964,467

PRECIPITATION INHIBITING

Joseph M. Lambert, Pittsburgh, and Joseph P. Copes and George J. Wright, Easton, Pa., assignors to General Aniline & Film Corporation, New York, N.Y., a corporation of Delaware No Drawing. Filed May 4, 1956, Ser. No. 582,653

4 Claims. (Cl. 210—58)

This invention relates to improvements in the inhibiting of precipitation in industrial and other liquids, and relates more particularly to the use of a composition which, when added to industrial and other waters, effectively inhibits the precipitation of any scale-forming ingredients in said waters.

It is known that many liquids dealt with in industry and household contain inorganic salts and that, when such liquids are led from one place to another through conduits, the inorganic salts form incrustations or scale on the inner wall of the conduits. To avoid the formation of incrustations or scale in the conduits, there is usually added to the liquids a precipitation inhibiting compound or composition.

It is an important object of this invention to provide an improved composition which will effectively inhibit the precipitation of inorganic salts from liquids containing the same.

Another object of this invention is the provision of an improved process for inhibiting precipitation in industrial brines.

Other objects and advantages of this invention will appear from the following detailed description and appended claims.

We have found that when a composition comprising a mixture of tauride having the formula

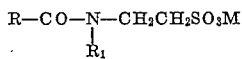

$$R-CO-N-CH_2CH_2SO_3M$$
$$\qquad\qquad |$$
$$\qquad\quad R_1$$

where R is a hydrocarbon residue of a carboxylic acid containing 8 to 18 carbon atoms, such as lauroyl, oleoyl, stearoyl, palmitoyl or abietinoyl, $R_1$ is hydrocarbon or a lower alkyl residue of from 1 to 6 carbon atoms and M is an alkali metal or ammonium residue, and an alkali metal phosphate is added to industrial (e.g. oil well brine) and other liquids precipitation of the salts in said liquids are inhibited to a surprising degree. Particularly desirable precipitation inhibiting effects are obtained when a composition comprising about 40 to 60 parts by weight of an alkali metal salt of N-tall oil-acyl-N-lower alkyl tauride and about 60 to 40 parts by weight of an alkali metal phosphate sequestering agent is added to industrial brines. The composition of the instant invention exercises a synergistic effect, being superior to either component thereof with respect to the degree of inhibition normally exhibited by each component and to the efficiency of each component, i.e. the amount of inhibitor required to achieve maximum precipitation inhibition.

The alkali metal salts of N-tall oil-acyl-N-lower alkyl taurides employed in the precipitation inhibiting composition of the instant invention and their methods of production are well known in the art. They are in general produced by reacting tall oil (a mixture of about 70% rosin acids and about 30% unsaturated acids) or functional derivatives thereof with alkali metal salts of N-lower alkyl taurines. While it is preferred to use the potassium salt of N-tall oil-acyl-N-methyl tauride in this invention, satisfactory results may also be obtained employing the sodium or potassium salts of N-tall oil-acyl-N-ethyl tauride, the sodium salt of N-tall oil-acyl-N-methyl tauride and the like.

The other essential component of the composition of the present invention, namely the alkali metal phosphate, as well as the preparation thereof, is also well known in the art. Examples of alkali metal phosphate which may be employed in said composition are alkali metal hexa- and tetrametaphosphates such as potassium hexametaphosphate, and sodium and potassium tetrametaphosphates, tripolyphosphates such as sodium tripolyphosphate, and pyrophosphates such as tetrasodium pyrophosphate and tetrapotassium pyrophosphate. However, because of its low cost, ready availability and superior action when combined with the potassium salt of N-tall oil-acyl-N-methyl tauride, it is preferred to use sodium hexametaphosphate in formulating the composition of this invention.

It is preferred that the compositions of the instant invention contain about equal parts by weight of the two components thereof and, when the compositions are added to industrial brines, they should be added in relatively small proportions for attaining the desired precipitation inhibiting effect. It has been found that a satisfactory precipitation inhibiting effect may be attained by adding at least about 0.1 part per million (p.p.m.) by weight and that the use of amounts greater than 50 p.p.m. is wasteful from the point of view of any increased inhibiting action obtainable thereby. Optimum results from the standpoint of economy and highly satisfactory precipitation inhibition are obtained when from about 0.5 to 5 p.p.m. by weight are added to the industrial brines.

The instant invention is highly advantageous for inhibiting precipitation of inorganic salts from saline solutions of various types and origins. Thus, this invention is particularly useful in preventing scale formation in conduits through which flow brines encountered in sulfur and salt mining operations and oil field brines which have the tendency to form or deposit strontium sulfate scale.

The instant invention is further illustrated, but not limited, by the following examples in which the parts are by weight unless otherwise indicated.

Example I

The following two brines were prepared:

|  | Brine A | Brine B |
|---|---|---|
| Sodium chloride | 147 grams | 22 grams. |
| Calcium chloride (anhydrous) | 27 grams | 5 grams. |
| Magnesium chloride hexahydrate | 30 grams | 4 grams. |
| Sodium bicarbonate | 0.1 grams | 0.5 grams. |
| Sodium sulfate (anhydrous) | 0 grams | 4 grams. |
| Strontium chloride hexahydrate | 10.7 grams | 0 grams. |
| Water to make | 1 liter | 1 liter. |

These brines are imitations of brines which occur naturally in oil fields and which, when mixed together, i.e. when pumped through a common conduit, give rise to strontium sulfate scale. When 100 grams of each brine were mixed together in a 250 ml. Erlenmeyer flask and allowed to stand at 35° C. for twenty-four hours, the following amounts of precipitate were recovered from duplicate experiments, the recovery being effected by filtering through an asbestos-lined Gooch crucible, washing, drying and weighing:

0.1411 grams
0.1485 grams

The instant example illustrates the tendency of the system to precipitate.

Example II

To a 250 ml. Erlenmeyer flask were added, in order:

100 grams of Brine A
0.5 ml. of 0.02% N-tall oil-acyl-N-methyl tauride, potassium salt in water
0.5 ml. of 0.02% sodium hexametaphosphate in water
100 grams of Brine B The resulting mixture was held at 35° C. for 24 hours. At the end of this time, no solid phase was visible to the eye. This material was filtered through an asbestos pad in a Gooch crucible, washed with a minimum of water, dried and weighed. The amount of residue found was 0.0002 gram.

In a duplicate experiment the residue was 0.0005 gram.

The instant example illustrates the effectiveness of ½ part per million of each of the agents in combination. It is considered that the figures immediately above are substantially zero, i.e. complete inhibition toward precipitation.

Example III

To each of six 250 ml. Erlenmeyer flasks were added 100 grams of Brine A. Then were added 0.2% sodium hexametaphosphate in water as follows:

| Experiment: | Ml. of 0.2% sodium hexametaphosphate |
|---|---|
| A | 0.05 |
| B | 0.05 |
| C | 0.1 |
| D | 0.2 |
| E | 0.2 |
| F | 0.4 |

Then to each of the above were added 100 g. of Brine B. After standing for 24 hours at 35° C., the following amounts of precipitate were recovered:

| | G. |
|---|---|
| A | .107 |
| B | .085 |
| C | .003 |
| D | .001 |
| E | .003 |
| F | .003 |

The instant example illustrates the inability of sodium hexametaphosphate to inhibit the system completely at any concentration. It also illustrates that sodium hexametaphosphate in the concentration of sodium hexametaphosphate plus N-tall oil-acyl-N-methyl tauride, potassium salt in Example II is not as effective as the mixture in Example II. It further illustrates that sodium hexametaphosphate alone in the concentration of Example II (Exp. A and B, Example III) is vastly inferior to the mixture of sodium hexametaphosphate and N-tall oil-acyl-N-methyl tauride, potassium salt.

Example IV

To each of six 250 ml. Erlenmeyer flasks were added 100 g. of Brine A. Then were added 0.2% N-tall oil-acyl-N-methyl tauride, potassium salt in water as follows:

| Experiment: | Ml. of 0.2% N-tall oil-acyl-N-methyl tauride, potassium salt |
|---|---|
| A | 0.1 |
| B | 0.1 |
| C | 0.3 |
| D | 0.3 |
| E | 0.5 |
| F | 0.5 | then to each was added 100 grams of Brine B.

After standing over a week-end of some 72 hours, the following amounts of precipitate were found gravimetrically:

| | G. |
|---|---|
| A | 0.029 |
| B | .035 |
| C | .004 |
| D | .006 |
| E | .003 |
| F | .005 |

The instant example illustrates that N-tall oil-acyl-N-methyl-tauride, potassium salt in any concentration is not as effective an inhibitor as the mixture sodium hexametaphosphate plus N-tall oil-acyl-N-methyl-tauride, potassium salt of Example II and by interpolation with Example I that the concentration of N-tall oil-acyl-N-methyl-tauride, potassium salt alone of Example II is not sufficient to account for the inhibition shown.

Example V

To a 250 ml. Erlenmeyer flask were added, in order:

100 grams of Brine A
0.1 ml. of .02% N-tall oil-acyl-N-methyl tauride, potassium salt in water
0.1 ml. of .02% sodium hexametaphosphate in water
100 grams of Brine B The resulting mixture was held at 35° C. for 27 hours. At the end of this time, this material was filtered through an asbestos pad in a Gooch crucible, washed with a minimum of water, dried and weighed. The amount of residue found was 0.0735 gram.

In a duplicate experiment the residue was 0.0689 gram.

The instant example illustrates the effectiveness of 1/10 part per million of each of the agents in combination, compared with either agent separately.

Example VI

To a 250 ml. Erlenmeyer flask were added, in order:

100 grams of Brine A
0.25 ml. of 0.02% N-tall oil-acyl-N-methyl tauride, potassium salt in water
0.25 ml. of 0.02% sodium hexametaphosphate in water
100 grams of Brine B The resulting mixture was held at 35° C. for 27 hours. At the end of this time, this material was filtered through an asbestos pad in a Gooch crucible, washed with a minimum of water, dried and weighed. The amount of residue found was 0.0086 gram.

In a duplicate experiment the residue was 0.0097 gram.

The instant example illustrates the effectiveness of ¼ part per million of each of the agents in combination.

Example VII

To a 250 ml. Erlenmeyer flask were added, in order:

100 grams of Brine A
0.5 ml. of 0.02% N-tall oil-acyl-N-methyl tauride, potassium salt in water
0.5 ml. of 0.02% sodium hexametaphosphate in water
100 grams of Brine B The resulting mixture was held at 35° C. for 27 hours. At the end of this time, no solid phase was visible to the eye. This material was filtered through an asbestos pad in a Gooch crucible, washed with a minimum of water, dried and weighed. The amount of residue found was 0.0005 gram.

In a duplicate experiment the residue was 0.0003 gram.

The instant example illustrates the effectiveness of ½ part per million of each of the agents in combination. It is considered that the figures immediately above are substantially zero.

Example VIII

To a 250 ml. Erlenmeyer flask were added, in order:

100 grams of Brine A
0.4 ml. of 0.2% N-tall oil-acyl-N-methyl tauride, potassium salt in water
0.4 ml. of 0.2% sodium hexametaphosphate in water
100 grams of Brine B The resulting mixture was held at 35° C. for 65 hours. At the end of this time, no solid phase was visible to the eye. This material was filtered through an asbestos pad in a Gooch crucible, washed with a minimum of water, dried and weighed. The amount of residue found was 0.0013 gram.

In a duplicate experiment the residue was 0.0016 gram.

The instant example illustrates the effectiveness of 4 parts per million of each of the agents in combination.

It is to be understood that the foregoing detailed description is given merely by way of illustration and that many variations may be made therein without departing from the spirit of our invention.

Having described our invention what we desire to secure by Letters Patents is:

1. An industrial brine to which has been purposefully added a composition comprising a mixture of about 40 to 60 parts by weight of the potassium salt of N-tall oil-acyl-N-methyl tauride and about 60 to 40 parts by weight of sodium hexametaphosphate in proportions of about 0.5 to 5 parts by weight per million parts of brine, whereby the precipitation of inorganic salts contained in said industrial brine is inhibited.

2. An industrial brine to which has been purposefully added a composition comprising a mixture of equal parts by weight of the potassium salt of N-tall oil-acyl-N-methyl tauride, and sodium hexametaphosphate in proportions of about 0.5 to 5 parts by weight per million parts of brine, whereby the precipitation of inorganic salts contained in said industrial brine is inhibited.

3. Process for inhibiting precipitation of inorganic salts from industrial brines, which comprises adding to industrial brine from about 0.5 to 5 parts by weight, per million parts of brine, of a composition comprising a mixture of about 40 to 60 parts by weight of the potassium salt of N-tall oil-acyl-N-methyl tauride and about 60 to 40 parts by weight of sodium hexametaphosphate.

4. Process for inhibiting precipitation of inorganic salts from industrial brines, which comprises adding to industrial brine from about 0.5 to 5 parts by weight, per million parts of brine, of a composition comprising a mixture of equal parts by weight of the potassium salt of N-tall oil-acyl-N-methyl tauride, and sodium hexametaphosphate.

References Cited in the file of this patent

UNITED STATES PATENTS

| | | |
|---|---|---|
| 1,901,321 | Münz | Mar. 14, 1933 |
| 2,258,260 | Rice | Oct. 7, 1941 |
| 2,264,103 | Tucker | Nov. 25, 1941 |
| 2,358,222 | Fink et al. | Sept. 12, 1944 |
| 2,576,386 | Bird | Nov. 27, 1951 |
| 2,628,162 | Sanders | Feb. 10, 1953 |
| 2,651,645 | Cross | Sept. 8, 1953 |
| 2,782,162 | Liddell | Feb. 19, 1957 |

OTHER REFERENCES

Libby: Application S.N. 154,738, 676 OG 889 (1953).

Stupel: Laboratory Laundering, 48 Chem. Abstr. 9723c (1954).